(12) United States Patent
Wang et al.

(10) Patent No.: US 7,035,537 B2
(45) Date of Patent: Apr. 25, 2006

(54) METHOD FOR WAVELENGTH SWITCH NETWORK RESTORATION

(75) Inventors: Daniel Wang, Beaverton, OR (US); David Wang, Portland, OR (US); Peter Abrams, Portland, OR (US); Yan Tang, Portland, OR (US)

(73) Assignee: Corvis Corporation, Columbia, MD (US)

( * ) Notice: Subject to any disclaimer, the term of this patent is extended or adjusted under 35 U.S.C. 154(b) by 782 days.

(21) Appl. No.: 09/896,813

(22) Filed: Jun. 29, 2001

(65) Prior Publication Data

US 2002/0041413 A1 Apr. 11, 2002

Related U.S. Application Data

(60) Provisional application No. 60/215,182, filed on Jun. 29, 2000, provisional application No. 60/215,399, filed on Jun. 29, 2000.

(51) Int. Cl.
*H04B 10/00* (2006.01)
(52) U.S. Cl. .............................. 398/7; 398/49
(58) Field of Classification Search ................ 398/1–7, 398/48–51, 30; 370/221, 222, 225
See application file for complete search history.

(56) References Cited

U.S. PATENT DOCUMENTS

| | | | |
|---|---|---|---|
| 4,956,835 A * | 9/1990 | Grover | 370/228 |
| 5,396,485 A | 3/1995 | Ohno et al. | 370/217 |
| 5,488,501 A * | 1/1996 | Barnsley | 398/51 |
| 5,548,639 A | 8/1996 | Ogura et al. | 379/221.04 |
| 5,581,543 A | 12/1996 | Natarajan | 370/221 |
| 5,586,112 A | 12/1996 | Tabata | 370/225 |
| 5,592,467 A | 1/1997 | Takeuchi et al. | 370/225 |
| 5,598,403 A | 1/1997 | Tatsuki | 370/221 |
| 5,903,370 A | 5/1999 | Johnson | 398/4 |
| 5,914,798 A | 6/1999 | Liu | 398/7 |
| 6,073,248 A | 6/2000 | Doshi et al. | 714/4 |
| 6,233,072 B1 | 5/2001 | Liu et al. | 398/5 |
| 6,671,256 B1 * | 12/2003 | Xiong et al. | 370/230 |

OTHER PUBLICATIONS

International Search Report for PCT/US01/20967.

* cited by examiner

*Primary Examiner*—Christina Y Leung

(57) ABSTRACT

A fiberoptic network with an optical supervisory channel in each of the optical fibers interconnecting the nodes of the network is described. Together with IP routers, the optical supervisory channels form a control network over which signaling and control signals are exchanged by which provisioning and restoration operations are performed at each node. To restore connections between the nodes upon a failure of the network, the control network helps to maintain at each node a synchronized database of network connections between the nodes, send messages to other nodes to initiate restoration operations by a node noticing the failure; and recalculate network connections around the failure by each node from a synchronized database at the node.

5 Claims, 4 Drawing Sheets

METHOD FOR WAVELENGTH SWITCH NETWORK RESTORATION

CROSS-REFERENCES TO RELATED APPLICATIONS

This patent application claims priority from Provisional Patent Application Nos. 60/215,182 and 60/215,399, both filed Jun. 29, 2000 and are hereby incorporated by reference.

BACKGROUND OF THE INVENTION

The present patent application is related to fiberoptic networks, and, in particular, to switches for WDM and DWDM network systems.

In WDM (Wavelength Division Multiplexing) fiberoptic networks, optical signals are sent at predetermined wavelengths over optical fibers. Each predetermined wavelength forms a communication channel in the network and the wavelength (or frequency) of the optical signal is used to control the destination of the signal through the network. An advanced version of WDM networks is the DWDM (Dense Wavelength Division Multiplexing) network in which the number of wavelength channel is increased by reducing the channel wavelength separation to 100 GHz, as set by the ITU (International Telecommunications Union). Hence the term, DWDM, is used herein to refer to both WDM and DWDM networks and other fiberoptic networks which rely upon wavelength to define communication channels, unless indicated otherwise.

In networks, including such fiberoptic networks described above, switches or routers are used to select paths for signals through the networks. In fiberoptic networks switches and routers not only direct optical signals from one optical fiber to another but also from one wavelength channel to another. The availability of light paths is critical to the users of a network. One way to provide reliability for a light path within the network is to explicitly provide for a redundant path beforehand. However, this approach does not utilize the bandwidth of the network efficiently, i.e., some of the available network capacity is removed for the backup reserve.

The present invention, on the other hand, is directed toward on-the-fly light path restoration to achieve efficient bandwidth usage and availability at the same time. New paths are quickly rerouted through the network in place of the lost light paths.

SUMMARY OF THE INVENTION

The present invention provides for a method of operation in an optical network having a plurality of interconnected nodes with each node capable of selectively switching optical signals in a first wavelength channel in an input fiber to any one of a plurality of wavelength channels and output fibers. The method restores connection between the nodes upon a failure of the network by maintaining at each of the nodes a synchronized database of network connections between the nodes; sending messages to other nodes to initiate restoration operations by a node noticing the failure; and recalculating the network connections around the failure by each node from the synchronized database at each node. Each node performs the recalculation independently.

The present invention also provides for a fiberoptic network having a plurality of interconnected nodes with each node capable of selectively switching optical signals in a first wavelength channel in an input fiber to any one of a plurality of wavelength channels and output fibers. A reserved wavelength channel between the interconnected nodes forms an optical supervisory channel to create a control network useful for network restoration and provisioning operations.

DESCRIPTION OF THE SPECIFIC EMBODIMENTS

Traditional network restoration techniques utilize a central network controller. When the network controller is notified of a network failure, it may signal provisioning information to one or more nodes in the network to implement alternate routes for circuits affected by the failure. The calculation of the alternate routes may occur before or after the failure.

Figure 1A:
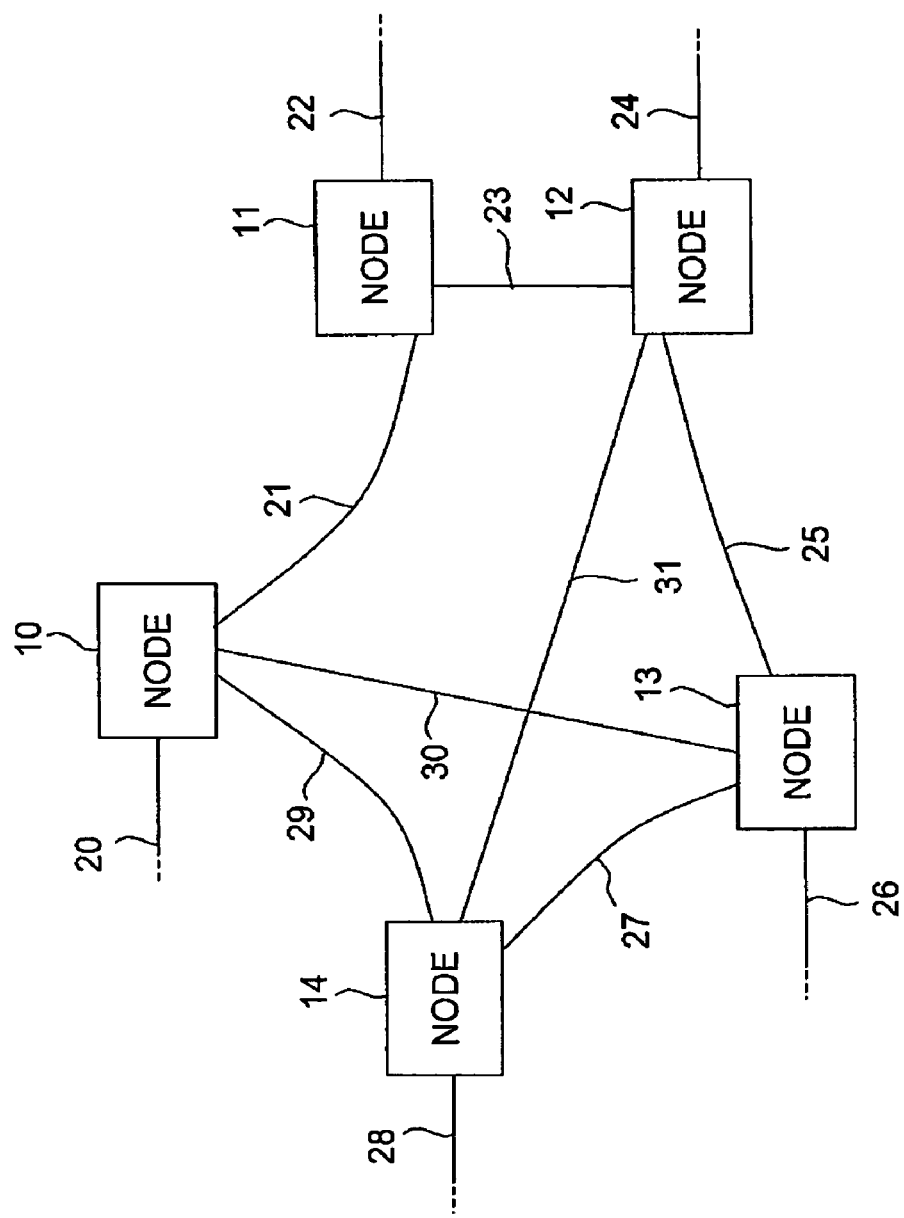
FIG. 1A is an exemplary DWDM network of a plurality of switch nodes operating according to the present invention.

The present invention seeks to speed up this process by utilizing embedded, distributed control logic in each node. The chief benefit of this distributed approach is a significant saving of signaling times between the nodes of the network. FIG. 1A illustrates an exemplary fiberoptic network with a plurality of switch nodes. Five switch nodes 10–14 have been selected for the purposes of explanation. More or less switch nodes could be used. Each of the switch nodes 10–14 is connected to external data fiberoptic lines 20, 22, 24, 26 and 28 respectively, which are represented by dotted lines. For example, the switch node 10 is connected to a plurality of fiberoptic lines connected to sources and receivers (not shown) external to the fiberoptic network, which lines are represented by the line 20. Likewise, the switch node 11 is connected to a plurality of externally-connected fiberoptic lines represented by the line 22, and so on. Within the fiberoptic network, the switch nodes 10–14 are interconnected by fiberoptic lines 21, 23, 25, 27, 29, 30 and 31 carrying data signals control.

For example, the line 21 represents a plurality of fiberoptic lines carrying data between the switch nodes 10 and 11. For controlling the operations of the pair of switch nodes (and the other switch nodes), the network reserves a wavelength channel in one or more of the optical fibers to carry control signals. The reserved wavelength channel may be one of the ordinary WDM wavelength channels, or the reserved wavelength channel might be a channel specially created for control signals. For example, a current WDM standard specifies 64 wavelength channels in one optical fiber and the reserved wavelength channel would be the $65^{th}$ channel placed at the wavelength boundary of the 64 channels. Likewise, the node 10 also is connected to the line 29 which represents a plurality of fiberoptic lines carrying data and control signals between the switch nodes 10 and 14, and so forth.

These reserved wavelength channels form a optical supervisory channel for control and signaling operations for the FIG. 1A network. The supervisory channels are marked with the suffix "A" after the reference numerals of the fiberoptic lines 21, 23, 25, 27, 29, 30 and 31 between the nodes 10–14 in which are embedded an IP (Internet Protocol) router 10A–14A. A processor and memory in each embedded router 10A–14A handles the administrative control operations of the associated node, including the provisioning and restoration operations described below. The network of dotted lines 21A, 23A, 25A, 27A, 29A, 30A and 31A and the IP routers 10A–14A form a control network for the data network shown in FIG. 1A. For these control and signaling functions, IP signals and commands are used with IP routers from Cisco Systems, Inc. of San Jose, Calif.

Figure 1B:
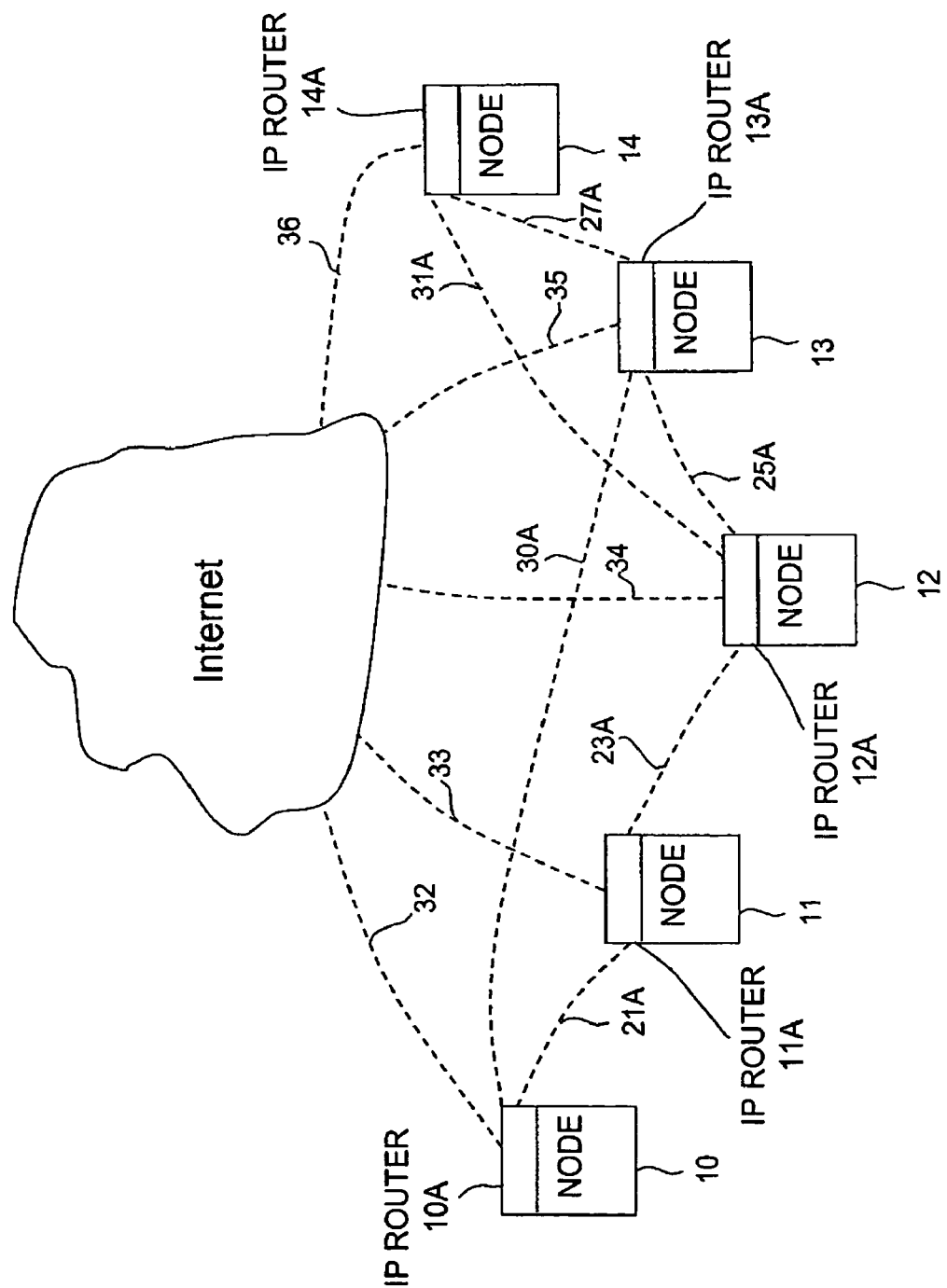
FIG. 1B illustrates the organization of the administrative and control network of the FIG. 1A switch nodes.

Besides the reserved wavelength channels illustrated by the dotted lines 21A, 23A, 25A, 27A, 29A, 30A and 31A between the switch nodes 10–14, an alternative control network can be used, i.e., the Internet. As illustrated in FIG. 1B, the IP routers 10A–14A are also connected to the Internet by connections indicated by dotted lines 32–36.

Figure 2:
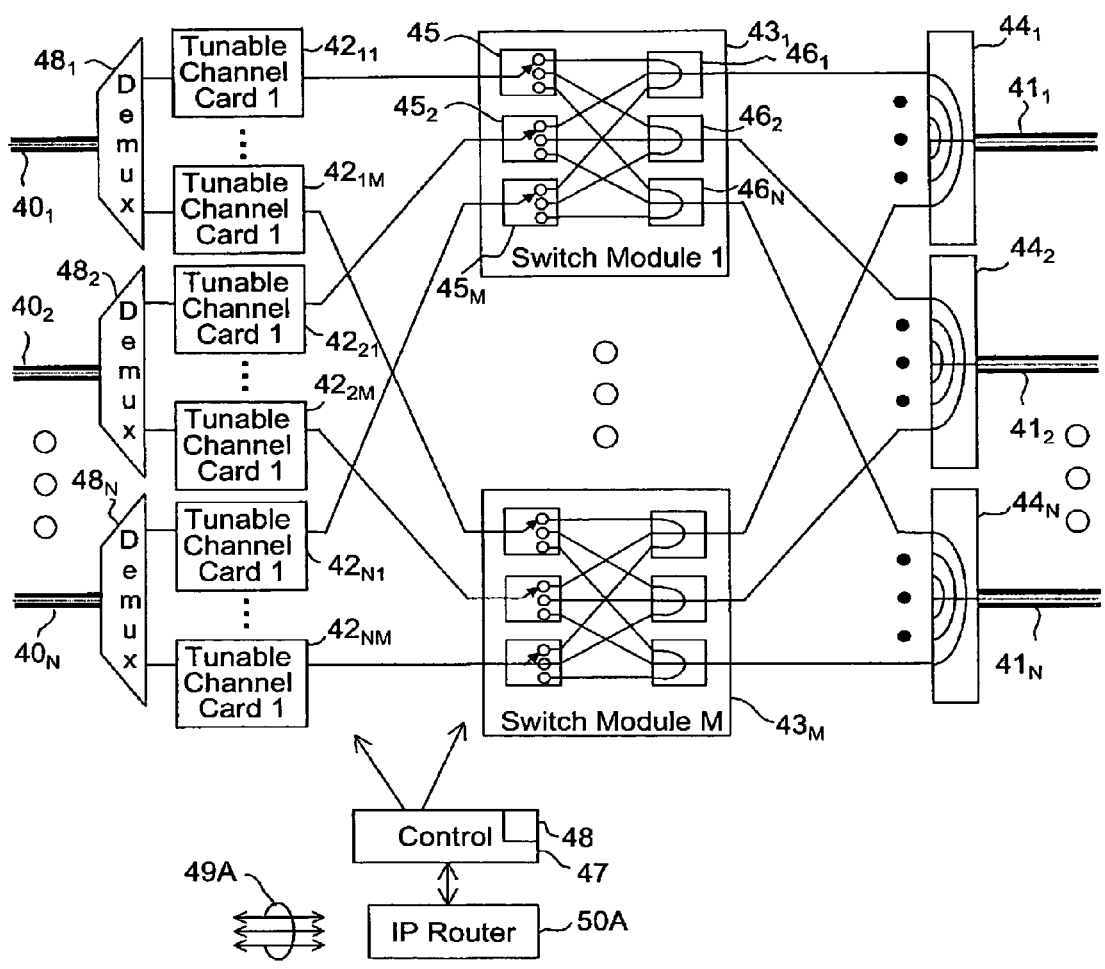
FIG. 2 illustrates the architecture of a switch forming one of the FIGS. 1A and 1Bswitch nodes.

The particular architecture of the switch nodes 10–14 is illustrated in FIG. 2. Each switch node is a fiberoptic switch which is connected, in this example, between N input optical fibers $40_1$–$40_N$ and N output optical fibers $41_1$–$41_N$. Depending upon the particular switch node 10–14, these optical fibers $40_1$–$40_N$ and $41_1$–$41_N$ correspond to the FIG. 1A lines which represent externally-connected optical fibers 20, 22, 24, 26 and 8, and switch node-connected optical fibers 21, 23, 25, 27, and 29–31 in FIG. 1A. Being part of a DWDM fiberoptic network, the input and optical fibers $40_1$–$40_N$ and $41_1$–$41_N$ are in which each of the optical fibers carries signals in M wavelength channels. Three input and three output fibers are illustrated in FIG. 2 for purposes of simplicity. The switch operates so that optical signals in any wavelength channel on any input fiber can be switched to any wavelength channel on any output fiber.

The fiberoptic switch of FIG. 2 has demultiplexers 48, tunable channel cards 42, a switch fabric formed by switch modules 43, combiners 44 and a control unit 47. It should be noted that ordinary reference numerals refer to elements in the drawings and subscripts to the reference numerals are used to denote the specific instances of these elements. Each of the input fibers $40_1$, $40_2$–$40_N$ are respectively connected to one of a corresponding number of demultiplexers $48_1$, $48_2$–$48_N$. Each of the demultiplexers separates the incoming optical signals by their wavelength channels. The signals of a separated wavelength channel are sent to a tunable channel card; hence for each demultiplexer $48_1$, $48_2$–$48_N$, there are M tunable channel cards, one for each wavelength channel. Each tunable channel card receives the optical signals in one wavelength channel and can translate the signals into a second wavelength channel, responsive to control signals from the control unit 47. Since there are N input fibers 40, each fiber having M channels, there are N×M tunable channel cards 42.

The tunable channel cards 42 are connected to a switch fabric, which, in conventional network switching terminology, constitutes the portion of a switch which performs the actual switching function. In the case of the FIG. 2 switch, the switch fabric is formed by M N×N switch modules associated with each one of the M wavelength channels. The inputs of each of the switch modules 43 are connected to each tunable channel card associated with the wavelength channel of that switch module. In the exemplary fiberoptic switch of FIG. 2, the switch module $43_1$ which receives wavelength channel 1 is connected to tunable channel card $42_{11}$, $42_{21}$–$42_{31}$. The switch module $43_M$ receives the signals from the tunable channel cards receiving signals in the Mth wavelength channel, i.e., cards $42_{1M}$, $42_{2M}$–$42_{3M}$. Each of the switch modules 43 has each of its N outputs connected to one of the N combiners 44, which are each connected to one of the output optical fibers 41. The first output terminals of all the switch modules 43 are connected to the corresponding input terminals of the first combiner $44_1$. The second output terminals of all the switch modules 43 are connected to the corresponding input terminals of the second combiner $44_2$. This pattern is repeated for all N output terminals of each switch module $43_1$–$43_M$.

The N×N switch module 43 is formed from N 1-to-N switch elements 45 and N N-to-1 combiners 46. The number 1 output terminals of the switch elements 1-N are connected to the corresponding input terminals 1-N of the first combiner $46_1$. The number 2 output terminals of the switch elements 1-N are connected to the corresponding input terminals 1-N of the second combiner $46_2$. This pattern is repeated for all N output terminals of each switch element $45_1$–$45_N$. Each switch element 45 corresponds to one of the inputs to the N×N switch module 43. To connect any input terminal to a specific output terminal of the switch module 43, the switch element 45 for that input terminal is set to the position for that output terminal. In this manner, signals on any combination of input terminals of the described fiberoptic switch can be sent to any combination of output terminals, with two constraints. Any single input terminal can only be connected to a single output terminal at a time. If multiple input terminals are connected to a single output terminals, the signals on the multiple input terminals must be noninterfering (i.e., the signals must be at different wavelengths/frequencies).

Operationally, to connect an incoming signal on some input fiber 40 at a first wavelength to an output fiber 41 on a different wavelength, two operations must be performed. First, the tunable channel card 42 which is associated with the incoming signal at the first wavelength on the input fiber 40 must be tuned to translate the signal to the correct outgoing wavelength. Also, the switch module 43 associated with that tunable channel card 42 must be configured to send the signal to the correct output fiber 41. These operations of the channel cards 42 and the switch modules 43 are directed by the control unit 47, which contains a processor unit, such as a microprocessor or a microcontroller, and memory 48. The memory 48 includes nonvolatile portions to hold software for restarting switch operations after the system goes down for any reason.

The reconfiguration process can be done fairly quickly. First, the input switch stage (i.e., the switch element 45) is turned off to disconnect the laser source in the tunable channel card 42. In an alternative arrangement, rather than switch elements 45 with off/on functions, off/on switches are placed between the switch elements 45 and the tunable channel cards 42, and the switch for the particular switch element 45 is turned off to disconnected the laser source in the tunable channel card 42. Then the laser is tuned to the new wavelength and the switch elements 45 in the corresponding switch module 43 are set to the correct states for the new configuration and the connection turned back on.

Hence these switches direct optical signals through designated optical fibers 20–31 and through the M wavelength channels in the FIG. 1A optical network. More details of these switches may be found in U.S. application Ser. No. 09/648,518, entitled, "Scalable DWDM Network Switch Architecture With Wavelength Tunable Sources," filed Aug. 25, 2000 by Chien-Yu Kuo, Niraj Gupta and Ronald Garrison, and assigned to the present assignee and which is incorporated herein by reference. However, it should be appreciated that the present invention is also applicable to fiberoptic networks with routers, hosts, and other types of switches at the nodes of the network.

The optical supervisory channels in the optical fibers 21, 23, 25, 27, 29–31 carry signaling and control signals between the switch nodes 10–14 for the restoration and provisioning operations. As stated previously, the signaling and control signals are in the form of IP commands through the IP routers 10A–14A. If one or more of the network component fails, network operations must be restored. For example, in the exemplary network of FIG. 1A, one or more of the optical fibers 20–31 may be cut to cause the loss of all the communication links of the optical fiber, or a laser source in a channel card may become inoperative to cause the loss of one link. Such a condition requires that the signals be rerouted and the links in the network be restored. Besides such a system-initiated recovery from a hardware failure, a network user might wish to initiate a configuration or reconfiguration of the network. Such an operation is often termed provisioning.

The optical supervisory channels indicated by the dotted lines 21A, 23A, 25A, 27A, 29A–31A in FIG. 1B are used for restoration and provisioning operations and in FIG. 2, these channels are symbolically represented by fibers 49A, which are arbitrarily shown as three in number, and coupled to an IP router 50A. The optical signals received on these optical supervisory channels are converted into electrical signals by the IP router 50A for input into the control unit 47. Similarly, the control unit 47 communicates to other control units in the switches of the network by converting the control unit's electrical output signals into optical signals and transmitting the signals through the IP router 50A onto the fibers 49A.

To handle these operations, restoration and provisioning software is stored in each switch node 10–14. The software contains both switch node management control software for each switch node and management system software for the whole mesh network. The two software components are divided and the management system software can be placed in the switch node or in a unit separated from the switch node, such as a standalone UNIX/NT box. The software interacts with two management information databases also stored at each switch node. One database is a local management information database which holds information about the switch node and the other is a network management information database which contains the cross-connect provisioning status across the entire mesh network. Only the restoration and provisioning operations can result in a database change. But the network management information database at each switch node must be guaranteed to be consistent across the entire mesh network with the other switch nodes for proper operation of the network. This is carried out by network synchronization.

To guarantee the database on each switch node is synchronized, the network operation is carried out either at every node or none at all. The initiating node of the operations determines whether the operation is successful or not, based on the acknowledgment from each node. The transaction is completed if every node carries out the operation successfully. Otherwise, the initiator sends out an abort transaction message to every node to cancel the operation.

The restoration operation is carried out in the following manner: First, a network restoration initiation message is broadcast through the network by the initiating switch node, i.e., the node noticing the hardware failure. The restoration calculation is done independently by each node at each local management information database upon receiving the restoration message and is coordinated by the initiating switch node. The calculation is based on the network management information database which is synchronized to be consistent at all times with the management information databases at the other nodes.

For the provisioning operations, a provisioning command modifies the cross-connect setup of the network and passes through a multiphase transaction protocol. First, the provisioning command is sent through the entire network to reserve the resource to be provisioned. The switch node issuing the command receives responses from all the switch nodes of the network. If all the responses are affirmative, the commanding node sends a "do-it" command to the entire network to do the actual provisioning operations as commanded. All the switch nodes send responses back to the commanding node as to the success of the provisioning operation and the commanding node either commits or aborts the entire transaction depending upon the responses.

Since a restoration transaction has higher priority than a provisioning transaction, the restoration transaction may or may not pre-empt the provisioning transaction before initiating the restoration. This depends upon whether the database is synchronized or not. At any time there can be no more than two transactions in progress, one provisioning transaction and one restoration transaction. Each transaction has a unique transaction number across the whole network.

To carry out these operations, each switch node has a network operation transaction state machine with the initial state as the Idle state. The switch node also keeps a Next Available Transaction Number (NATN), which is initialized to a default value and is then synchronized once it joins the network. The states are as follows:

Idle Neither Provisioning nor Restoration transaction is in progress.

Init_RSV Provisioning transaction is in progress. The node is the initiator of this transaction and is in Reserved (RSV) state.

RSV Provisioning transaction is in progress. The node is NOT the initiator of this transaction and is in Reserved state.

Init_CMT Provisioning transaction is in progress. The node is the initiator of this transaction and is in Committed (CMT) state.

CMT Provisioning transaction is in progress. The node is NOT the initiator of this transaction and is in Committed state.

$Init_{13}$ RST Restoration transaction is in progress. The node is the initiator of this transaction and is in Restored (RST) state.

RST Restoration transaction is in progress. The node is NOT the initiator of this transaction and is in Restored state.

Init_RSV & Init_RST Both Provisioning and Restoration transactions are in progress. The node initiates both transactions and is in Reserved and Restored State for each transaction respectively.

Init_CMT & Init_RST Both Provisioning and Restoration transactions are in progress. The node initiates both transactions and is in Committed and Restored State for each transaction respectively.

RSV & RST Both Provisioning and Restoration transactions are in progress. The node initiates NEITHER transaction and is in Reserved and Restored State for each transaction respectively.

CMT & RST Both Provisioning and Restoration transactions are in progress. The node initiates NEITHER transaction and is in Committed and Restored State for each transaction respectively.

Init_RSV & RST Both Provisioning and Restoration transactions are in progress. The node initiates the Provisioning transaction but NOT the Restoration transaction and is in Reserved and Restored State for each transaction respectively.

Init_CMT & RST Both Provisioning and Restoration transactions are in progress. The node initiates the Provisioning transaction but NOT the Restoration transaction and is in Committed and Restored State for each transaction respectively.

RSV & Init_RST Both Provisioning and Restoration transactions are in progress. The node initiates the Restoration transaction but NOT the Provisioning transaction and is in Reserved and Restored State for each transaction respectively.

CMT & Init_RST Both Provisioning and Restoration transactions are in progress. The node initiates the Restoration transaction but NOT the Provisioning transaction and is in Committed and Restored State for each transaction respectively.

Figure 3:
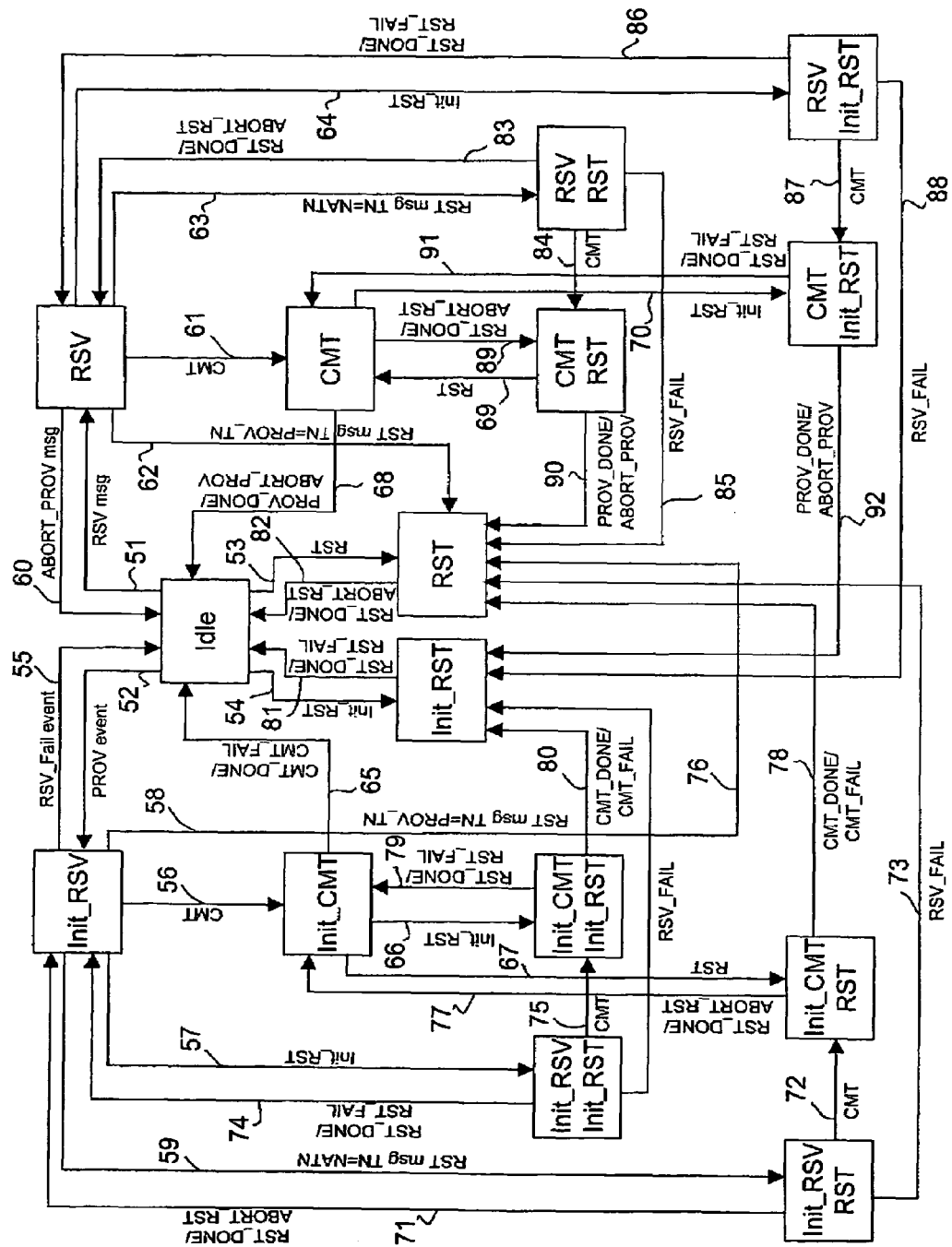
FIG. 3 illustrates the transitions from one state to another for a switch node, according to the present invention.

The transition from state to another in a switch node is triggered by a message or an event. A triggering message is generated by an operation-initiating switch node for transmission to the other switch nodes. A triggering event results from a user request or acknowledgment from other node. FIG. 3 illustrates the possible transitions for a switch node from one state to another as a result of a message or event. States are indicated by boxes and the transitions are indicated by arrows between the states and labeled with the triggering message or event. For convenience, the table below lists the possible transitions from one state to another, the transition's triggering message or event, the resulting actions at the transitioning switch node with transition reference numerals as used in FIG. 3.

| Ref. num. | Trigger (event/ msg) | From-State | To-State | Action |
|---|---|---|---|---|
| 51 | RSV msg | Idle | RSV | Reserve in management information database. Send confirmation back to initiating node. PROV_TN = NATN Increment NATN. |
| 52 | PROV event | Idle | Init_ RSV | Reserve in management information database. Send RSV msg with NATN to every node. PROV TN = NATN. Increment NATN. |
| 53 | RST msg | Idle | RST | Restore in management information database and hardware as requested. Send confirmation back to initiating node. RST_TN = NATN. Increment NATN. |
| 54 | RST event | Idle | Init_ RST | Restore in management information database and hardware. Send RST msg with NATN to every node. RST_TN = NATN. Increment NATN. |
|  |  | Idle | Idle |  |
| 55 | RSV_ FAIL event | Init_ RSV | Idle | If receive RSV_ DENIED msg, abort PROV local and send ABORT_ PROV msg to every node. (If timeout, abort PROV and exclude the timed out nodes from topology. Retry PROV again.) |
| 56 | CMT event | Init_ RSV | Init_ CMT | Commit in management information database and hardware. Send CMT msg to every node. |
| 57 | RST event | Init_ RSV | Init_ RSV Init_ RST | Restore in management information database and hardware. Send RST msg with NATN to every node. Increment NATN. |
| 58 | RST msg TN = PROV_ TN | Init_ RSV | RST | Abort PROV locally. Send ABORT_PROV msg to every node. Restore in management information database and hardware as requested. Send confirmation back to initiating node. |
| 59 | RST msg TN = NATN | Init_ RSV | Init_ RSV RST | Restore in management information database and hardware as requested. Send confirmation to initiating node. Increment NATN. |
|  |  | Init_ RSV | Init_ RSV |  |
| 60 | ABORT_PROV msg | RSV | Idle | Abort PROV locally. |
| 61 | CMT msg | RSV | CMT | Commit in management information database and hardware. Send confirmation back to initiating node. |
| 62 | RST msg TN = PROV_ TN | RSV | RST | Abort PROV locally. Restore in management information database and hardware as requested. RST_TN = msg TN Send confirmation to initiating node. |
| 63 | RST msg TN = NATN | RSV | RSV RST | Restore in management information database and hardware as requested. Send confirmation to initiating node. Increment NATN |
| 64 | RST event | RSV | RSV Init_ RST | Restore in management information database and hardware. Send RST msg with NATN to every node. Increment NATN. |
|  |  | RSV | RSV |  |
| 65 | CMT_FAIL/ CMT_DONE event | Init_ CMT | Idle | If CMT_FAIL, abort PROV locally and send ABORT_PROV msg to every node. (If timeout, abort PROV and exclude the timed out nodes from topology. Retry PROV again.) If CMT_DONE, send PROV_DONE msg to initiating node. |
| 66 | RST event | Init_ CMT | Init_ CMT Init_ RST | Restore in management information database and hardware. Send RST msg with NATN to every node. Increment NATN. |

-continued

| Ref. num. | Trigger (event/msg) | From-State | To-State | Action |
|---|---|---|---|---|
| 67 | RST msg | Init_CMT | Init_CMT_RST | Restore in management information database and hardware as requested. Send confirmation to initiating node. Increment NATN. |
|  |  | Init_CMT | Init_CMT |  |
| 68 | ABORT_PROV/ PROV_DONE msg | CMT | Idle | If ABORT_PROV, abort PROV locally. If PROV_DONE, do nothing. |
| 69 | RST msg | CMT | CMT_RST | Restore in management information database and hardware as requested. Send confirmation to initiating node. Increment NATN. |
| 70 | RST event | CMT | CMT_Init_RST | Restore in management information database and hardware. Send RST msg with NATN to every node. Increment NATN. |
|  |  | CMT | CMT |  |
| 71 | RST_DONE/ ABORT_RST msg | Init_RSV_RST | Init_RSV | If RST_DONE, do nothing. IF ABORT_RST, abort RST in management information database and hardware. |
| 72 | CMT event | Init_RSV_RST | Init_CMT_RST | Commit in management information database and hardware. Send CMT msg to every node. |
| 73 | RSV_FAIL event | Init_RSV | RST | Abort PROV locally. Send ABORT_PROV msg to every node. |
|  |  | Init_RSV_RST | Init_RSV_RST |  |
| 74 | RST_DONE/ RST_FAIL event | Init_RSV_Init_ | Init_RSV_RST | If RST_DONE, send RST_DONE msg to every node. If RST_FAIL, abort RST locally and send ABORT_RST msg to every node. |
| 75 | CMT event | Init_RSV Init_RST | Init_CMT Init_RST | Commit in management information database and hardware. Send CMT msg to every node. |
| 76 | RSV_FAIL event | Init_RSV Init_RST | Init_RST | Abort PROV locally. Send ABORT_PROV msg to every node. |
|  |  | Init_RSV Init_RST | Init_RSV Init_RST |  |
| 77 | RST_DONE/ ABORT_RST msg | Init_CMT_RST | Init_CMT_RST | If RST_DONE, do nothing. If ABORT_RST, abort RST locally. |
| 78 | CMT_DONE/ CMT_FAIL event | Init_CMT_RST | RST | If CMT_DONE, send PROV_DONE msg to every node. If CMT_FAIL, abort PROV locally and send ABORT_PROV msg to every node. |
|  |  | Init_RSV Init_RST | Init_RSV Init_RST |  |
| 79 | RST_DONE/ RST_FAIL event | Init_CMT Init_RST | Init_CMT | If RST_DONE, send RST_DONE msg to every node. If RST_FAIL, abort RST locally and send ABORT_RST msg to every node. |
| 80 | CMT_DONE/ CMT_FAIL event | Init_CMT Init_RST | Init_RST | If CMT_DONE, send PROV_DONE msg to every node. If CMT_FAIL, abort PROV locally and send ABORT_PROV msg to every node. |
|  |  | Init_CMT Init_RST | Init_CMT Init_RST |  |
| 81 | RST_DONE/ RST_FAIL event | Init_RST | Idle | If RST_DONE, send RST_DONE msg to every node. If RST_FAIL, abort RST locally and send ABORT_RST msg to every node. |
|  |  | Init_RST | Init_RST |  |
| 82 | RST_DONE/ ABORT_RST msg | RST | Idle | If RST_DONE, do nothing If ABORT_RST, abort RST locally. |
|  |  | RST | RST |  |
| 83 | RST_DONE/ ABORT_RST msg | RSV_RST | RSV_RST | If RST_DONE, do nothing. If ABORT_RST, abort RST locally. |
| 84 | CMT msg | RSV_RST | CMT_RST | Commit in management information database and hardware. Send confirmation to initiating node. |
| 85 | RSV_FAIL msg | RSV_RST | RST | Abort PROV locally. |
|  |  | RSV_RST | RSV_RST |  |
| 86 | RST_DONE/ RST_FAIL event | RSV_Init_RST | RSV | If RSV_DONE, send RST_DONE msg to every node. If RST_FAIL, abort RST locally and send ABORT_RST msg to every node. |
| 87 | CMT msg | RSV_Init_RST | CMT_Init_RST | Commit in management information database and hardware. |
| 88 | RSV_FAIL msg | RSV_Init_RST | Init_RST | Abort PROV locally. |
|  |  | RSV_Init_RST | RSV_Init_RST |  |
| 89 | RST_DONE/ ABORT_RST msg | CMT_RST | CMT_RST | If RST_DONE, do nothing. If ABORT_RST, abort RST locally. |
| 90 | PROV_DONE/ ABORT_PROV msg | CMT_RST | RST | If PROV_DONE, do nothing. If ABORT_PROV, abort PROV locally. |
|  |  | CMT_RST | CMT_RST |  |
| 91 | RST_DONE/ RST_FAIL event | CMT_Init_RST | CMT | If RST_DONE, send RST_DONE msg to every node. IF RST_FAIL, abort RST locally and send ABORT_RST msg to every node. |

-continued

| Ref. num. | Trigger (event/ msg) | From- State | To- State | Action |
|---|---|---|---|---|
| 92 | PROV_DONE/ ABORT_PROV msg | CMT Init_ RST CMT Init_ RST | Init_ RST  CMT Init_ RST | If PROV_DONE, do nothing. If ABORT_PROV, abort PROV locally. |

In the described distributed network approach, the principal objective of the signaling protocol is to disseminate the failure event information to every node in the network as quickly as possible. Hence signaling is used for the failure event information only, and not to cross-connect provisioning information. Broadcast mechanisms are used for signaling, which use pre-provisioned fixed alternate routes through the optical supervisory channels.

Each failure event message is identified by the source node and a node-specific Failure Event Message Number. Each receiving node keeps track of each other node's current Failure Event Message Number. If a duplicate is received, it is ignored and discarded. In the case of a bi-directional fiber cut, two nodes detect the same network failure and each initiate the broadcast signaling. In this case, other nodes in the network must reconcile the two failure event messages as describing the same single event. In order to perform such reconciliation, each node starts a timer upon receipt of a failure event message. If another "similar" failure event message is received before expiration of the timer, then the new message is ignored and discarded.

In order to better utilize the embedded IP (Internet Protocol) routers 10A–14A of each node 10–14, multiple fixed alternate routes are pre-provisioned from each node to every other node in the network. Upon local detection of a network failure, a node transmits a series of IP packets, each containing the failure event message, one for each fixed alternate route to each node. The IP router network (illustrated by the network in FIG. 1B) then handles the delivery of the IP packets to their final destinations. By provisioning more than one route between each pair of nodes, the network is guarded against changes in the network topology, for example, a fiber cut. If one route is blocked by a failed fiber, the other IP packet following the other route has a continuous path to its destination.

The receiving nodes detect and discard duplicate messages. Hence, after a switch node receives a failure event message, the node participates in the flooding protocol described above. The switch node then releases all the wavelength channel resources (i.e., bandwidth) of the optical circuits available for use by alternate routes, despite the network failure. Then in priority order, the shortest path for each affected circuit is recalculated, using only available, i.e., in service but unused, network resources. The optical circuits are restored in a predetermined prioritized order in this manner.

Each switch node recalculates a new path for each circuit whose active path had traversed the failed link. Each node evaluates the results of the path calculation to determine whether or not that node must execute any new cross-connects. If so, the cross-connects are executed. If not, then that node takes no action, and its participation in the network restoration is completed. All switch nodes perform the identical deterministic calculation, and therefore arrive at the same conclusion.

To determine the alternate routes, the switch nodes use a version of E.W. Djikstra's "Shortest Path First" (SPF) algorithm to route circuits. U.S. patent application Ser. No. 09/896,843, entitled "Improved Shortest Path First Restoration Routing In a Fiberoptic Network," filed of even date by Peter Abrams and assigned to the present assignee, and which application is incorporated herein by reference, describes the modified implementation of the SPF algorithm in its operation in the exemplary FIGS. 1A and 1B network. Also the particular link metrics, such as number of hops, path delay, link cost, etc., used in the algorithm are also described.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. In an optical network having a plurality of interconnected nodes, each node capable of selectively switching optical signals in a first wavelength channel and an input fiber and to any one of a plurality of wavelength channels and output fibers, a method of restoring connection between said nodes upon a failure of said network, said method comprising
   maintaining at each of said nodes a synchronized database of network connections between said nodes;
   wherein said synchronized database maintaining step comprises
   accepting results of said recalculating network connections at all of said interconnected nodes of said optical network if all nodes complete said recalculation network connections step successfully; and
   rejecting said results of said recalculation steps at all of said interconnected nodes of said optical network if one or more nodes do not complete said recalculation network connections step successfully;
   sending messages to other nodes to initiate restoration operations by a node noticing said failure; and
   recalculating network connections around said failure by each node from a synchronized database at said node wherein said recalculating network connections step is performed independently by each node.

2. The method of claim 1 wherein said accepting results substep is performed upon acknowledgment by each node of successful completion of said recalculation network connections step.

3. The method of claim 2 wherein successful completion of said recalculation network connections step is acknowledged by transmitting an acknowledgment message to said node noticing said failure, said node transmitting a message to all other of said interconnected nodes of said optical network to update databases of said interconnected nodes of said optical network with said results.

4. The method of claim 1 wherein said rejecting results substep is performed by lack of acknowledgment by one or more nodes of successful completion of said recalculation network connections step.

5. The method of claim 4 wherein said rejecting results substep further includes said node noticing said failure transmitting a message to all other of said interconnected nodes of said optical network to abort said results.

\* \* \* \* \*